Nov. 10, 1959  L. PERAS  2,911,952
DOUBLE-ACTING PNEUMATIC JACK

Filed Dec. 7, 1955  6 Sheets—Sheet 1

Nov. 10, 1959  L. PERAS  2,911,952
DOUBLE-ACTING PNEUMATIC JACK
Filed Dec. 7, 1955  6 Sheets-Sheet 2

Nov. 10, 1959

L. PERAS 2,911,952

DOUBLE-ACTING PNEUMATIC JACK

Filed Dec. 7, 1955

Nov. 10, 1959     L. PERAS     2,911,952
DOUBLE-ACTING PNEUMATIC JACK
Filed Dec. 7, 1955     6 Sheets-Sheet 4
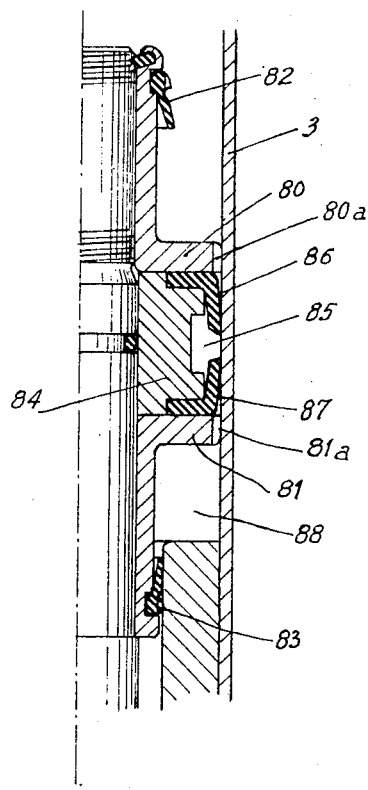
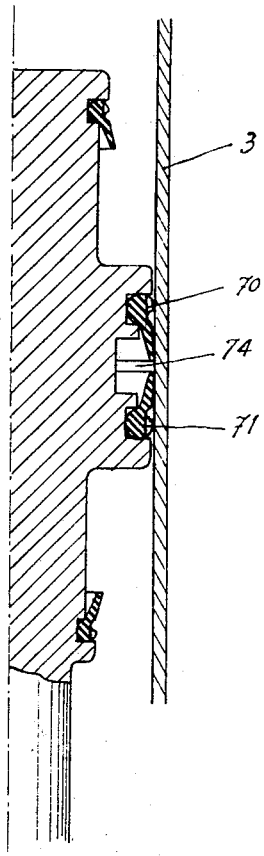
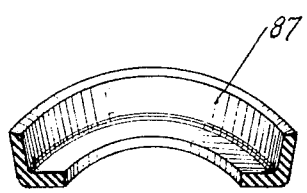

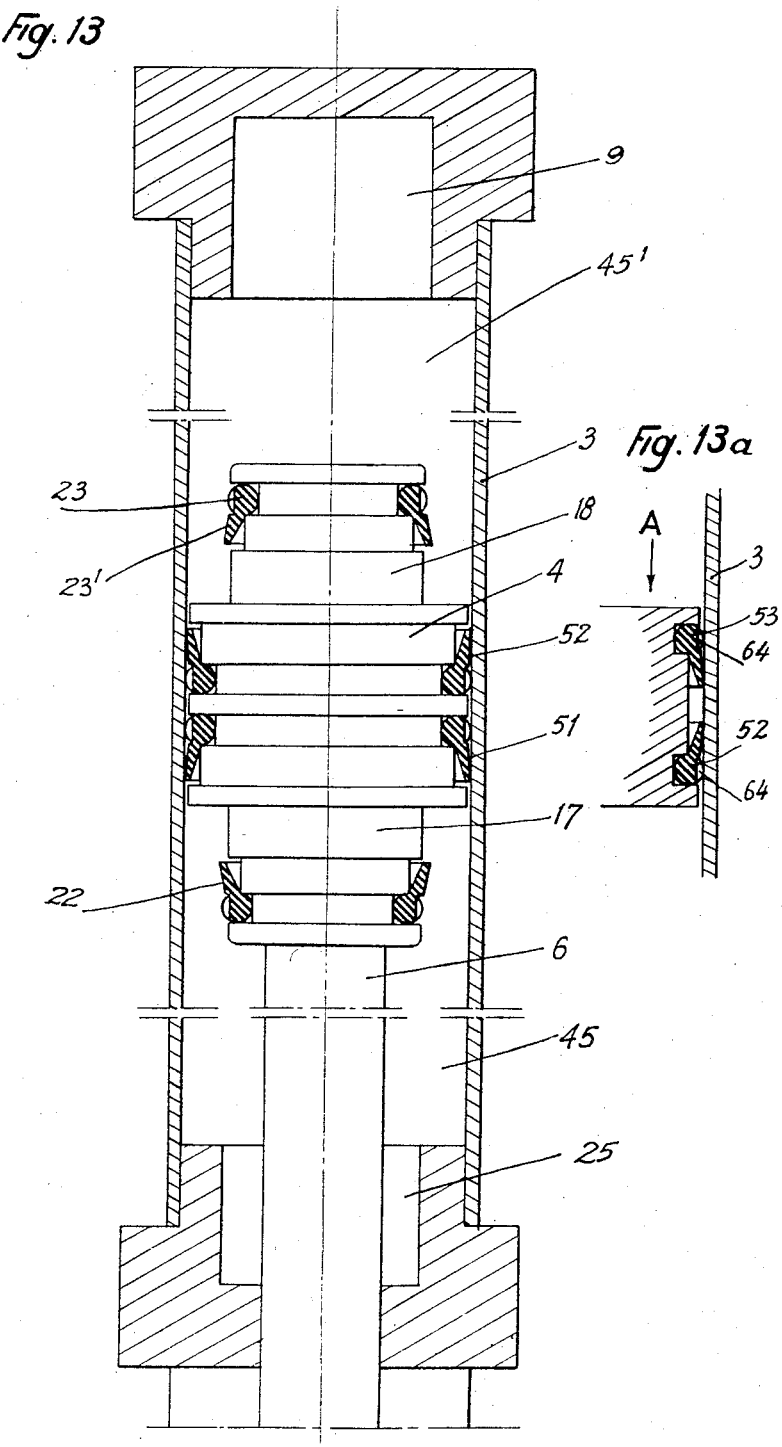

Nov. 10, 1959     L. PERAS     2,911,952
DOUBLE-ACTING PNEUMATIC JACK
Filed Dec. 7, 1955     6 Sheets-Sheet 6

United States Patent Office
2,911,952
Patented Nov. 10, 1959

2,911,952

DOUBLE-ACTING PNEUMATIC JACK

Lucien Peras, Billancourt, France, assignor to Regie Nationale des Usines Renault, Billancourt, France Application December 7, 1955, Serial No. 551,626

Claims priority, application France April 28, 1955

8 Claims. (Cl. 121—38)

The invention relates to a double-acting pneumatic jack.

The jacks at present in use show air leakages after being in service for a relatively short time. Moreover, their use in atmospheres which are highly charged with dust necessitates frequent dismantling and re-assembly with a view to cleaning them.

The pneumatic jack according to the invention constitutes an important improvement in this respect because it can operate without leakage for several million working cycles. According to the invention, the various means co-operating to obtain this result comprise essentially the injection of the escaping air close to the packing ring effecting the sealing of the piston rod at the end of the jack and the evacuation of said air along said rod, the provision of adjustable pneumatic damping devices on each side of the piston and the use of packing rings of the type described in my U.S. application Serial No. 551,627, filed December 7, 1955, now Patent No. 2,889,183, for "Packing Ring."

Another improvement according to the invention has the advantage of permitting the elimination of the slow running escape conduit and needle-regulating screw passage provided in the cylinder ends. The slow-running conduit cross-section is actually very small and may become blocked. According to the invention, the central portion of the piston carries, for this purpose, two converging packing rings with flexible rims, said packing rings being disposed in such a manner as to end in an annular chamber provided in the central portion of the piston. The air compressed during the damping of the displacement of the piston, can then escape, above a certain pressure, between the piston and the cylinder and, by a yielding of the rim of one of the packing rings, can enter the annular chamber of the piston.

It has already been seen that in order to accentuate the damping effect, the air passage is reduced. Conversely, in order to weaken it, said passage is increased.

This method of constructing a damping device is expensive; moreover it necessitates setting the needle-regulating screw for each different application.

One specific embodiment enables these disadvantages to be overcome and consists in providing in the rimmed packing ring of the type indicated above, one or more perforations or slots, without removing any material from the rims, which remain closed for normal pressures obtaining in the apparatus but open and cause a leakage when the pressure increases beyond a predetermined value.

Several embodiments of the pneumatic jack according to the invention will now be described, by way of non-limiting example, with reference to the accompanying drawings in which:

Figure 10 is a vertical section of half the central portion of the jack, illustrating yet another embodiment;

Figure 11 shows a packing ring;

Figure 12 shows another embodiment of the jack shown in Figure 9, wherein the piston is cast in one piece with the rod, and wherein the ends of the pistons have different diameters;

Figure 13 is a longitudinal section through another modification of the jack;

Figure 13a is a section through part of the central portion of the jack showing a modification of the mounting of the packing rings;

Figure 1:
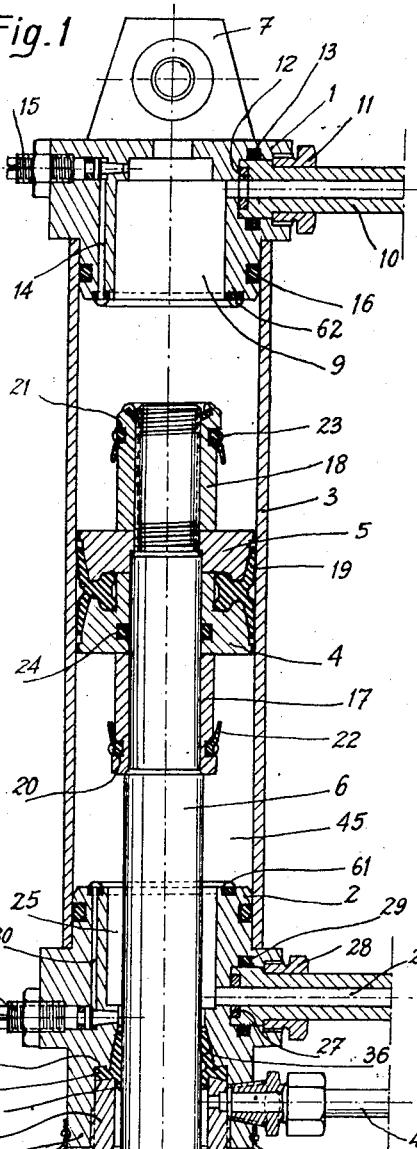
Figure 1 is a view of the jack in elevation and section.

The jack assembly is illustrated in Figure 1. It comprises two cylinder ends 1 and 2, joined together by rods (not illustrated) the two ends being provided respectively in each end of a tube 3 forming a cylinder. In the cylinder 3 there is displaced a piston formed by a supporting ring 4 and a retaining ring 5, these members being carried by a piston rod 6 which passes through the cylinder end 2. The cylinder end 1 and the piston rod 6 respectively carry the lugs 7 and 8 which serve, the former for hanging up the jack and the latter for fixing a jack hook (not illustrated) carrying the load.

Figure 6:
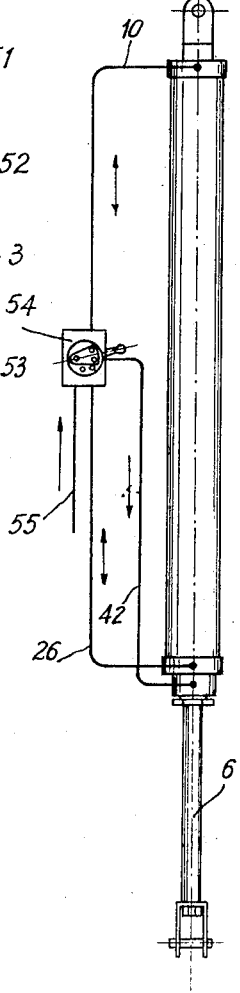
Figure 6 shows diagrammatically the distribution of the compressed air.

The cylinder head 1 comprises an internal chamber 9 which is in communication with a conduit 10 fixed by means of a retaining nut 11 and which is connected to a compressed air supply network by means of a distributor illustrated in figure 6). The end of the conduit 10 carries a calibrated orifice 12 which reduces the air supply to the proper value; a packing ring 13 effects sealing between the conduit 10 and the cylinder head 1.

A duct 14 leading to the cylinder 3 is provided in the cylinder end and ends in a needle regulating screw 15 enabling the amount of air escaping through the duct 14 to the outside to be regulated. A packing ring 16 effects sealing between the cylinder head 1 and the cylinder 3.

The piston rod 6 carries a lower damping sleeve 17, the supporting ring 4 and the retaining ring 5 constituting the actual piston, and an upper damping sleeve 18 which is screwed onto the rod 6. Between the members 4 and 5 of the piston is mounted a packing ring 19 of the type described in detail in my U.S. application Serial No. 551,627, filed December 7, 1955, now Patent No. 2,889,183, for "Packing Ring." The sleeves 17 and 18 comprise circular grooves 20 and 21 in which are housed the packing rings 22 and 23, likewise described in the patent application mentioned above and the mode of action of which will be recalled below. A packing ring 24 of a conventional type is provided on the piston rod 6.

Figure 3:
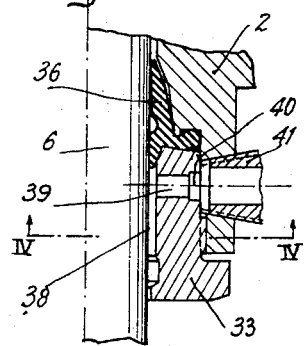
Figure 3 shows a detail of the device for injecting the escaping air.
Figure 4:
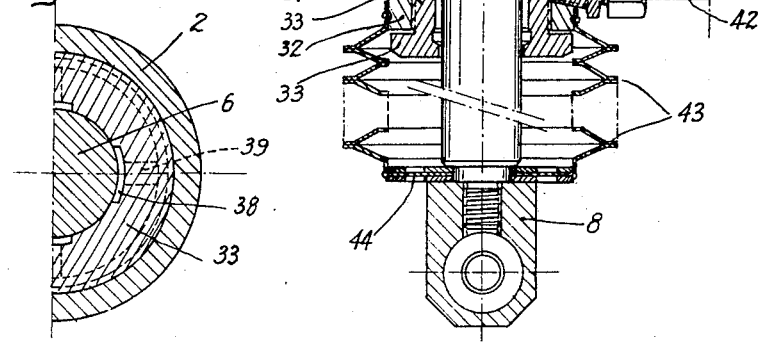
Figure 4 is a plan view of the device in Figure 3, in section along the axis IV—IV in said figure.

The lower portion of the lower cylinder end 2 is similar to the upper cylinder end already described. The bottom of the cylinder end 2 comprises an internal chamber 25, a conduit 26 connected to the compressed air supply, with a calibrated orifice 27, screwed connection 28 and packing ring 29, an escape duct 30 and the needle-regulating screw 31. The outside of the cylinder end 2 is in the form of a ring 32 in which is screwed a stuffing gland 33, said two members forming between them a seating 34 in which is housed the bead of a packing ring 35 of the type described in my above-mentioned patent application, that is to say comprising a sealing rim 36 and a scraper rim 37. This portion of the jack is illustrated on a larger scale in Figures 3 and 4 which show that the clearance 38 between the rod 6 and the gland 33 is quite considerable, the importance of which arrangement will be explained below.

The chamber 38 is connected by passages such as 39 to a circular groove 40 to which leads a connection 41 which locates a conduit 42 connected to the compressed air supply. Also fixed to the ring 32 is one end of a rubber bellows 43 (Figure 1) which surrounds the rod 6 and the other end of which is rigidly connected to said rod by means of a filter plate 44.

Rubber stops 61 and 62, in the form of castellated rings are provided on the cylinder ends opposite the piston. Figure 2a is a view of such a stop in section.

The operation of the jack thus described is as follows:

When the piston 4—5 is in the position as shown in Figure 1, the air distributor is controlled, for example in such a manner as to cause the hook carried by the lug 8 to move downwards. Air is then admitted through the conduit 10 and the orifice 12 into the upper portion of the jack and its pressure is exerted downwardly on the piston. The latter then moves down driving before it the air contained in the chamber 45. This air escapes through the chamber 25 and the conduit 26 and the distributor returns it to the conduit 42 whence it is injected into the space 38. The air sweeps this space carrying with it any foreign bodies which may have entered and thus keeps the scraper rim 37 clean. The air then escapes, with the dust, if any, into the bellows 43 and to the outside through the filter plate 44. It has been found that this injection of escaping air, according to the invention, has the advantage of keeping the packing ring 35 in service condition and, moreover, of making the escape of the air more silent than in the conventional jacks. It should be noted that a small fraction of the air driven out by the piston is also evacuated through the duct 30 and the needle-regulating screw 31.

Figure 2:
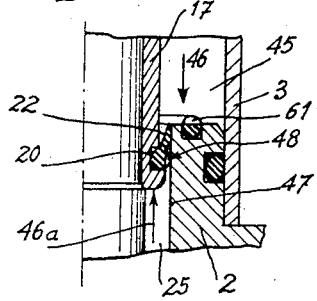
Figure 2 shows the lower damping device of the piston engaged in the lower cylinder end.
Figure 2A:
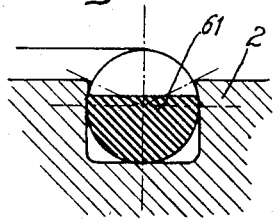
Figure 2a is a view in section of a portion of a stop mounted on a cylinder end.

When the sleeve 17 enters the chamber 25 (which position is illustrated in Figure 2), the air still contained in 45 can no longer escape through the conduit 26 because the packing ring 22 forms a seal in this direction, the pressure exerted in the direction of the arrow 46 (Figure 2) applying its rim tightly against the wall 47. The air present in 45 is thus again compressed and can only escape through the duct 30 and the needle regulating screw 31. The downward movement of the piston continues but is slowed down. This device therefor acts as a damping device. The regulation of the flow of air through the duct 30 by means of the needle regulating screw 31 permits the downward speed of the piston to be controlled during the latter part of its stroke. If the damping effect is inadequate, for example in the event of deterioration of the packing rings 21 and 22, the piston strikes against the stop rings 61 and 62, thus preventing the destruction of the apparatus.

When the piston has to move up again, the compressed air is admitted through the conduit 26, enters the space 25 (Figure 2) and then the space 45, because the packing ring permits the passage of air in the direction of the arrow 46a through the channels 48 provided on the periphery of the bead and by yielding of the rim 22. As the air enters the space 45 (Figure 1), the piston 4—5 rises again and is damped when the sleeve 18 enters the space 9. The air which escapes through the conduit 10 is injected through the conduit 42 in the same manner as before and escapes through the bellows and the filter plate 44.

Figure 5:
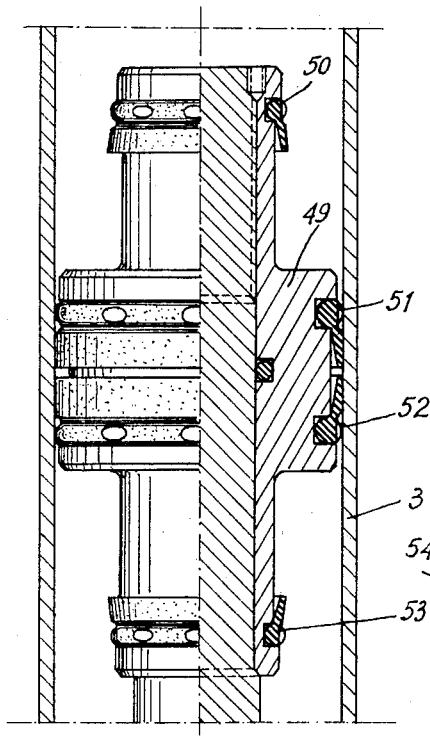
Figure 5 is a view in section of a different embodiment of the piston of the jack.

A different embodiment of the piston of the jack is illustrated in Figure 5. This shows the cylinder 3 which contains a piston 49 on which are mounted four packing rings 50, 51, 52 and 53 similar to the rings 22 and 23 in Figure 1. The piston is mounted on a piston rod. The packing rings 51 and 52 replace the packing ring 19 in Figure 1 and have the advantage of permitting the construction of the piston and its extensions in a single piece.

Figure 8:
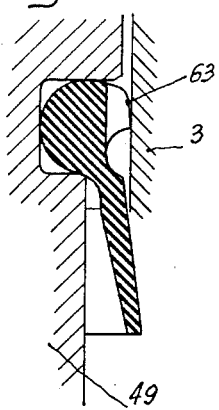
Figure 8 represents an embodiment of a packing ring having a lateral rim and peripheral grooves.

A particularly advantageous form of the packing ring of the type used at 50, 51, 52, and 53 is shown in Figure 8. The toroidal body of the packing ring, in this embodiment, has a bevelled surface 63 on the outside, which improves the sliding and guiding properties of a piston fitted with this packing ring.

The compressed-air distribution system is shown diagrammatically in Figure 6. The distributor 54 receives the air through the conduit 55 and, according to its setting, sends it to the conduit 10, that is to say to the top of the cylinder, or to the conduit 26, that is to say to the bottom of the cylinder. The air driven out by the piston is forced, in either case, into the conduit 42 and injected along the piston rod 6.

Figure 7:
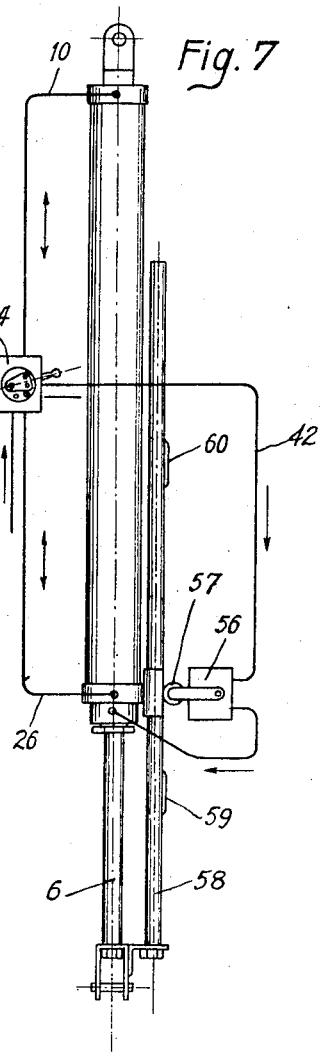
Figure 7 illustrates diagrammatically another embodiment of said distribution.

A supplementary means of regulating the speed of displacement of the piston is illustrated in Figure 7. A restricting device 56, of any known type, is connected into the conduit 42 through which passes the escaping air. This restrictor is controlled by the displacements of a roller 57 which rolls on a rod 58 rigidly connected to the piston rod 6 and carrying cams such as 59 and 60. The passage of one of these cams under the roller 57 has the effect of restricting the flow of air and consequently of slowing down the displacement of the piston of the jack. Suitable positioning of the cams 59, 60 etc. on the rod 58 therefore enables the movement of the piston to be slowed down at certain points in its stroke.

Figure 9:
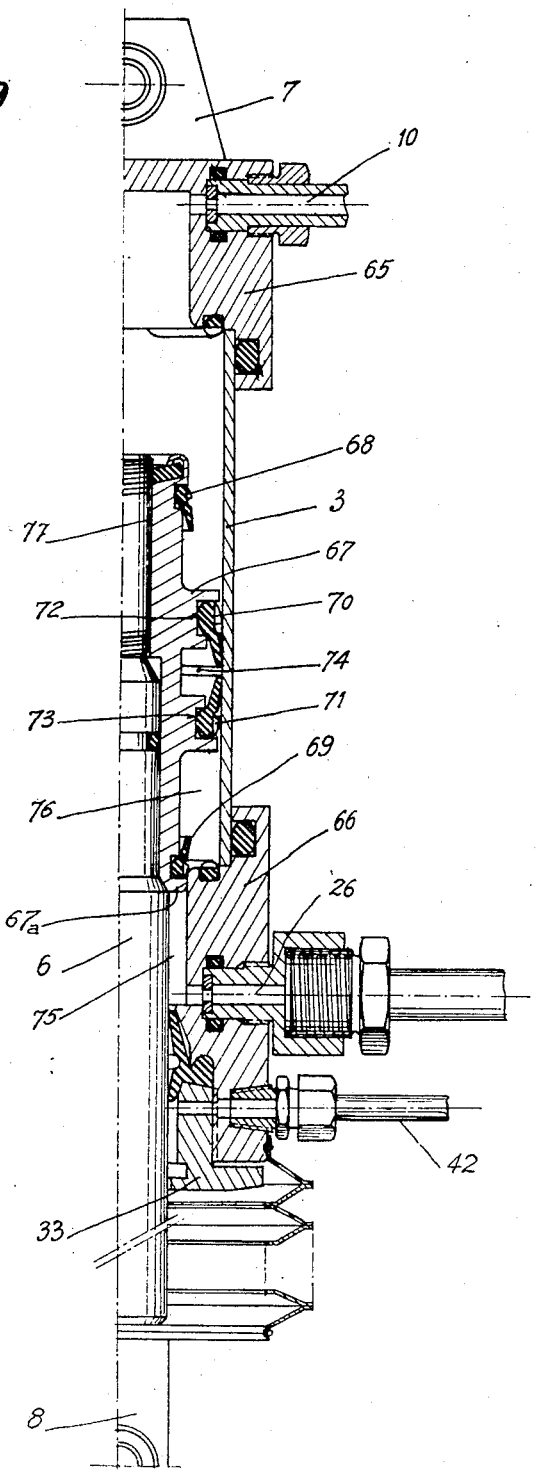
Figure 9 is a vertical section through half the jack assembly illustrating another embodiment.
Figure 14:
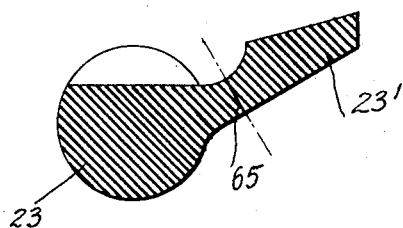
Figure 14 shows the packing ring of the damping device, mounted without pressure.

As shown in Figure 9, another embodiment of the jack according to the invention comprises some of the main members of the jack which has just been described.

In the two ends of the cylinder 3 respectively lead the air conduits 10 and 26, which are connected to a distributor, not illustrated, by means of which each of said conduits may be brought into communication with the source of compressed air or with the conduit 42 for injecting the escaping air between the piston rod 6 and the stuffing gland 33. The rod 6 carries the lug 8 and the upper cylinder head 65 carries the suspension lug 7. The upper cylinder head 65 only brings the cylinder 3 into communication with the conduit 10 and does not comprise any other escape conduit. Similarly the lower cylinder end 66 only permits communication between the cylinder 3 and the conduit 26, no other escape conduit being provided.

The piston rod 6 carries the piston 67 formed by a sleeve screwed onto the end of the piston rod, made integral with the rod for small jacks (see Figure 12). The two extensions of the piston carry the packing rings 68 and 69 of the type described above, that is to say having a single lateral rim and peripheral channels.

The central portion of the piston 67, the outer diameter of which is less than the inner diameter of the cylinder so that there is no contact between the piston and the cylinder, carries two piston rings 70 and 71, of the same type as the piston rings 68 and 69, mounted in the slots 72, 73 so as to converge. An annular chamber 74 is provided between the packing rings 70 and 71.

The operation of the jack is as follows:

Assuming that, in the position illustrated in Figure 9, the piston is required to move downwards, that is to say that the air distributor for the jack is set in such a manner as to cause the air to enter the cylinder through the conduit 10 while the conduit 26 permits escape, then from the moment when the lower extension 67a of the piston 67 enters the central chamber 75, the air contained in the annular space 76, formed by the piston, the cylinder 3, and the cylinder end 66, is compressed. The movement of the piston is therefore damped at the end of its stroke.

The pressure in the space 76 increases rapidly up to a certain value very slightly exceeding that of the pressure obtained in the cylinder above the piston, and consequently in the chamber 74. The compressed air at 76 then escapes into the chamber 74 passing between the piston and the cylinder and causing the rim of the packing ring 71 to yield; the relative weakness of the counter-pressure prevents any deterioration in the packing rings. The pressure in the interior of 74 will not increase indefinitely. The limit is attained with a pressure corresponding to the ratio of the volume of space comprised between the piston 67, the cylinder 3, and the end closure 65 when the gasket 68 comes into contact with the chamber of reduced diameter in the end closure 65 to the volume of the same space when the piston reaches the end of its path. At this moment the pressure in chamber 74 no longer increases. The operation of the device is obviously similar when the piston rises. It is possible, as in Figure 12, to provide different end (ferrule) diameters, thus permitting different damping on moving up and down.

This improvement has the advantage of rendering the machining of the cylinder ends more simple as a result of the omission of the slow escape ducts and their needle regulating screws. On the other hand, since the piston is not in contact with the cylinder except through packing rings, the machining of the piston proper, consisting of a single member, may be limited to making its bore and the threading 77; the piston and its rod may also constitute a single member. Finally, there is no need to worry about regulating the damping of the piston, said regulation being determined by the construction of the jack, and particularly by the volume of the chamber 74.

When the pressures are equalized at the end of the stroke in jacks provided with the devices forming the subject of the present invention, the jack acts only in accordance with the cross-sectional areas formed, and behaves like a differential jack.

A different embodiment of the jack according to the invention is illustrated in Figure 10. There the piston is formed by two lateral members 80 and 81, carrying respectively the packing rings 82 and 83 and a central member 84, in which is provided an annular chamber 85. Between the members 80 and 84 on the one hand and 81 and 84 on the other hand, are gripped two packing rings 86 and 87, said packing rings being cup-shaped. Such a packing ring is illustrated on a larger scale in Figure 11.

This packing ring has a slightly tapered outer surface acting as a rim. It does not effect the guiding of the piston which must be obtained by the fit of the said piston in the cylinder. Channels 80a and 81a permit the passage of air at the time of damping.

The operation of the jack thus equipped is similar to that of the jack in Figure 9, that is to say, the air compressed at 88, for example, causes the rim of the packing ring 87 to yield, and it escapes into the chamber 85.

In Figure 13, which shows a modified form of the embodiment of Fig. 9, 3 is the cylinder of the jack, 4 the piston, connected to the rod 6 passing through the cylinder head by means of a packing ring of the type described above; 17, 18 are two cylindrical extensions of the piston which engage at the end of the stroke in the cylindrical portions 9 and 25 in the cylinder ends. The extensions 17, 18 are provided with packing rings 22, 23 such as those described above, and the piston 4 is provided with packing rings 51 and 52, similar to those illustrated in Figure 5. The cylinder heads at the ends of cylinder 3 are shown diagrammatically since they have a construction identical with the cylinder heads of Fig. 9 and the differences between Figs. 9 and 13 reside in the structure of the piston alone.

At the moment when the packing ring 23 enters the cylindrical portion 9 of the cylinder head, the air contained in $45^1$ is compressed, and the increasing value of said compression progressively damps the movement of the piston until it is brough to a stop.

No shock occurs and the members of the jack are not subjected to dangerous fatigue. The operation of such a jack lasts practically indefinitely.

If the volume $45^1$ was reduced to nil at the end of the stroke, it would obviously be impossible for the displacement of the piston to take place completely. It is therefore necessary to provide, by suitable machining of the piston and of the cylinder ends, a residual volume which limits to a predetermined value the air pressure damping the movement. This value is expressed by the ratio between the residual volume and the volume $45^1$ at the moment when the packing ring 23 comes into contact with the cylindrical portion 9. This ratio may vary from ½ to ⅙ according to the use to which the jack is put and the value of the counter-pressure on escape.

A high counterpressure—small diameter of the passages connecting the jack to the distributors, the distance of these or other causes—leads to an increase in the residual volume, and hence in the ratio on slowing down. The slowing down ratio is likewise high when the jack has to complete its stroke precisely without any considerable stopping time at the end of each stroke.

On the other hand, a jack for handling heavy loads does not require a rigorous stroke and would permit a low slowing down ratio effecting a highly damped stopping.

The piston rings are preferably mounted in opposition as shown in Figure 13a. The advantage of this arrangement immediately becomes apparent: the compressed air, acting in the direction of the arrow A for example, pushes the piston by means of the packing ring 52, the rim of which is applied against the cylinder 3, but at the same time separates the rim of the packing ring 53 from the cylinder, as the piston is displaced in this direction, thus reducing the pressure of said rim against the cylinder and hence its wear, while preventing the possible bending back thereof, which is important.

In order that the packing ring 53 can permit the passage of air towards the packing ring 52—and conversely, during the reverse movement of the piston, in order that the packing ring 52 can permit the passage towards the packing ring 53, channels 64 and 65 are provided on the torodial portions of said packing rings. It is likewise possible to leave a circular air passage by providing the torodial member with a diameter slightly less than the diameter of the cylinder.

In order to obtain satisfactory sealing of the packing ring on the piston, it is advisable to mount the packing ring tightly in its housing on the inner diameter.

The above description is only given to recall the operation of the jack previously described.

According to the use to which the jack is put and the value of the counter-pressure on escape, it may happen that the jack does not effect a complete stroke, that is to say it can happen that the piston does not come right into contact with the head. In certain cases this may constitute a disadvantage. Previously provision was made for the adjustable escape of air by means of a needle regulating screw.

This arrangement permits the disadvantage recalled above to be overcome completely and consists in providing in the rim of the packing ring of the damping device 22 or 23, one or more pinholes 65, as shown in Figures 14, 15, 16, 17 and 18. When the extension of the piston 18 enters the cylindrical portion 9, the compressed air in the chamber $45^1$ exerts a pressure against the rim $23^1$ of the packing ring 23.

At the beginning of the penetration of piston 4, the pressure in $45^1$ is too low for the air to pass through the pinholes, the packing ring behaves like a normal packing ring (Figure 18, right-hand side) and the damping effect begins.

Figure 15:
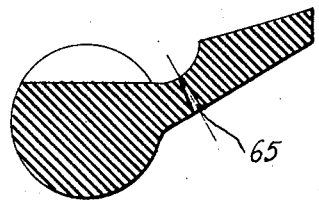
Figure 15 shows the same packing ring mounted under slight pressure (perforation opening slightly)
Figure 16:
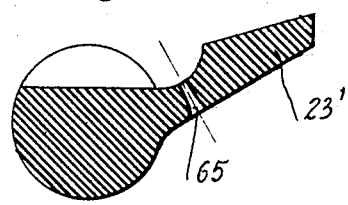
Figures 16 and 17 show the same packing ring subjected to increasing pressures (perforation further and further open)
Figure 17:
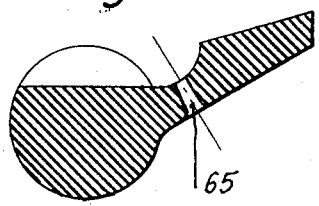
Figure 18:
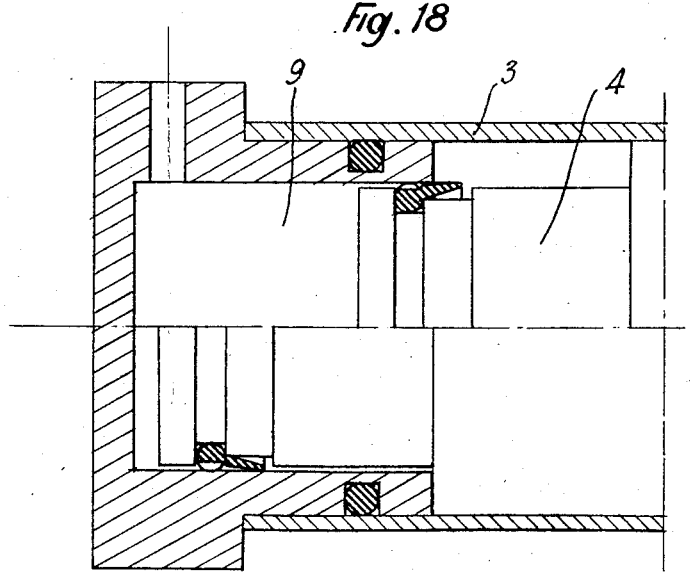
Figure 18 shows the longitudinal section through the damping portion of a jack, made in accordance with one feature of the invention.

As the pressure in $45^1$ increases, the pinholes 65 begin to open (Figure 15). A certain amount of air escapes through these holes and the increase in the damping effect is reduced.

There is then a substantially greater opening of the holes (Figures 16 and 17) which permits the compressed air to escape and enables the piston to complete its full stroke, as shown at the left in Fig. 8, while ensuring an increasing and therefore fully effective damping effect.

This embodiment according to the invention represents a very important progress in devices using a conduit and a needle regulating screw in that it is much less expensive and that the damping of the jack takes place automatically whatever the conditions of use and the value of the escape counterpressure.

Moreover, the stroke of the jack is complete.

I claim:

1. A pneumatic jack of the double-acting type comprising, in combination, means defining a cylinder, end closures for said cylinder having first and second cylindrical chambers formed therein of lesser diameter than the diameter of said cylinder and communicating directly with said cylinder at each end thereof, a piston movable axially in said cylinder and comprising a main body portion and axially-extending opposite end portions dimensioned to be received respectively in the cylindrical chambers of said end closures, pneumatic conduits connected to said end closures and communicating with said chambers, said conduits being adapted to be connected to a source of compressed air for supplying said air to said chambers, a piston rod connected to said piston, said piston rod having a diameter less than the diameter of said chambers and passing through said second chamber to a point exteriorly of the corresponding end closure, a third chamber axially-spaced from said second chamber along said piston rod and means for introducing a fluid under pressure into said third chamber and resilient sealing means around said piston rod between said third chamber and said second chamber.

2. A pneumatic jack of the double-acting type comprising, in combination, means defining a cylinder, end closures for said cylinder having first and second cylindrical chambers formed therein of lesser diameter than the diameter of said cylinder and communicating directly with said cylinder at each end thereof, a piston movable axially in said cylinder and comprising a main body portion and axially-extending opposite end portions dimensioned to be received respectively in the cylindrical chambers of said end closures, the body portion of said piston being provided with at least one packing member and rings carried by said piston to hold said packing member in position, pneumatic conduits connected to said end closures and communicating with said chambers, said conduits being adapted to be connected to a source of compressed air for supplying said air to said chambers, a piston rod connected to said piston, said piston rod having a diameter less than the diameter of said chambers and passing through said second chamber to a point exteriorly of the corresponding end closure, a third chamber axially-spaced from said second chamber along said piston rod and means for introducing a fluid under pressure into said third chamber and resilient sealing means around said piston rod between said third chamber and said second chamber, and a bellows means communicating with said third chamber and enclosing the portion of the piston in the region axially beyond said third chamber.

3. A pneumatic jack of the double-acting type comprising, in combination, means defining a cylinder, end closures for said cylinder having first and second cylindrical chambers formed therein of lesser diameter than the diameter of said cylinder and communicating directly with said cylinder at each end thereof, a piston movable axially in said cylinder and comprising a main body portion and axially-extending opposite end portions dimensioned to be received respectively in the cylindrical chambers of said end closures, said end portions each being provided with a sealing gasket, pneumatic conduits connected to said end closures and communicating with said chambers, said conduits being adapted to be connected to a source of compressed air for supplying said air to said chambers, a piston rod connected to said piston, said piston rod having a diameter less than the diameter of said chambers and passing through said second chamber to a point exteriorly of the corresponding end closure, a third chamber axially-spaced from said second chamber along said piston rod and means for introducing a fluid under pressure into said third chamber and resilient sealing means around said piston rod between said third chamber and said second chamber, and a bellows means communicating with said third chamber and enclosing the portion of the piston in the region axially beyond said third chamber.

4. A pneumatic jack of the double-acting type comprising, in combination, means defining a cylinder, end closures for said cylinder having cylindrical chambers formed therein of lesser diameter than the diameter of said cylinder and communicating directly with said cylinder at each end thereof, means defining a piston movable axially in said cylinder and comprising a main body portion and axially-extending opposite end portions dimensioned to be received respectively in the cylindrical chambers of said end closures, said end portions each being provided with a sealing gasket having a single lateral rim portion and peripheral channels in said end portion effective to permit controlled escape of air from said chambers when the end portions of said piston enter therein but preventing ingress of air from said cylinder to said chambers when the end portions enter therein, pneumatic conduits connected to said end closures and communicating with said chambers, said conduits being adapted to be connected to a source of compressed air for supplying said air to said chambers, and a piston rod connected to said piston, said piston rod having a diameter less than the diameter of said chambers and passing through one of said chambers to a point exteriorly of the corresponding end closure.

5. A pneumatic jack of the double-acting type comprising, in combination, means defining a cylinder, end closures for said cylinder having cylindrical chambers formed therein of lesser diameter than the diameter of said cylinder and communicating directly with said cylinder at each end thereof, means defining a piston movable axially in said cylinder and comprising a main body portion and axially-extending opposite end portions dimensioned to be received respectively in the cylindrical chambers of said end closures, said piston body portion being sealed in relation to said cylinder by a pair of axially-spaced-apart packing rings each having a single rim formed with peripheral channels, said rims extending in axially-opposite directions to one another, pneumatic conduits connected to said end closures and communicating with said chambers, said conduits being adapted to be connected to a source of compressed air for supplying said air to said chambers, means for permitting controlled escape of air from said chambers when the end portions of said piston selectively enter said chambers upon axial movement of said piston in said cylinder, and a piston rod connected to said piston, said piston rod having a diameter less than the diameter of said chambers and passing through one of said chambers to a point exteriorly of the corresponding end closure.

6. A pneumatic jack of the double-acting type comprising, in combination, means defining a cylinder, end closures for said cylinder having cylindrical chambers formed therein of lesser diameter than the diameter of said cylinder and communicating directly with said cylinder at each end thereof, means defining a piston movable axially in said cylinder and comprising a main body portion and axially-extending opposite end portions dimensioned to be received respectively in the cylindrical chambers of said end closures, said piston body portion being sealed in relation to said cylinder by a pair of axially-spaced-apart packing rings each having a single rim formed with peripheral channels, said rims extending in axially-opposite directions to one another, the outer edge surfaces of said packing rings being bevelled, pneumatic conduits connected to said end closures and communicating with said chambers, said conduits being adapted to be connected to a source of compressed air for supplying said air to said chambers, means for permitting controlled escape of air from said chambers when the end portions of said piston selectively enter said chambers upon axial movement of said piston in said cylinder, and a piston rod connected to said piston, said piston rod having a diameter less than the diameter of said chambers and passing through one of said chambers to a point exteriorly of the corresponding end closure.

7. A pneumatic jack of the double-acting type comprising, in combination, means defining a cylinder, end closures for said cylinder having first and second cylindrical chambers formed therein of lesser diameter than the diameter of said cylinder and communicating directly with said cylinder at each end thereof, means defining a piston movable axially in said cylinder and comprising a main body portion and axially-extending opposite end portions dimensioned to be received respectively in the cylindrical chambers of said end closures, said end closures being provided with annular resilient stops positioned to be engaged by the piston in the event of inadequate pneumatic damping, pneumatic conduits connected to said end closures and communicating with said chambers, said conduits being adapted to be connected to a source of compressed air for supplying said air to said chambers, a piston rod connected to said piston, said piston rod having a diameter less than the diameter of said chambers and passing through said second chamber to a point exteriorly of the corresponding end closure, a third chamber axially-spaced from said second chamber along said piston rod and means for introducing a fluid under pressure into said third chamber and resilient sealing means around said piston rod between said third chamber and said second chamber, and a bellows means communicating with said third chamber and enclosing the portion of the piston in the region axially beyond said third chamber.

8. A pneumatic jack of the double-acting type comprising, in combination, means defining a cylinder, end closures for said cylinder having cylindrical chambers formed therein of lesser diameter than the diameter of said cylinder and communicating directly with said cylinder at each end thereof, means defining a piston movable axially in said cylinder and comprising a main body portion and axially-extending opposite end portions dimensioned to be received respectively in the cylindrical chambers of said end closures, pneumatic conduits connected to said end closures and communicating with said chambers, said conduits being adapted to be connected to a source of compressed air for supplying said air to said chambers, means for permitting controlled escape of air from said chambers when the end portions of said piston selectively enter said chambers upon axial movement of said piston in said cylinder, and a piston rod connected to said piston, said piston rod having a diameter less than the diameter of said chambers and passing through one of said chambers to a point exteriorly of the corresponding end closure, said body portion of the piston being provided with an annular peripheral chamber and a pair of axially-spaced-apart packing rings having web portions converging toward said annular chamber to effect sealing of the cylinder with respect to the piston in such manner that the compressed air in the cylinder at the end of the piston stroke can escape in the event of excess pressure into the annular chamber of the piston by a yielding of the packing ring web which separates said air from said annular chamber.

References Cited in the file of this patent

UNITED STATES PATENTS

| | | |
|---|---|---|
| 679,421 | Halsey | July 30, 1901 |
| 975,314 | Baker | Nov. 18, 1910 |
| 2,080,451 | Wilcox | May 18, 1937 |
| 2,344,055 | Osborn | Mar. 14, 1944 |
| 2,642,845 | Stevens | June 23, 1953 |
| 2,699,756 | Miller | Jan. 18, 1955 |
| 2,710,595 | Peterson | June 14, 1955 |
| 2,719,510 | Elder | Oct. 4, 1955 |